(12) United States Patent
Hengel et al.

(10) Patent No.: US 7,880,112 B2
(45) Date of Patent: Feb. 1, 2011

(54) METHOD FOR WELDING AND ADHESIVELY ATTACHING A SHAPED FASTENER TO INSIDE OF MEMBER

(75) Inventors: James F. Hengel, Romeo, MI (US); Pei-Chung Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1024 days.

(21) Appl. No.: 11/674,168

(22) Filed: Feb. 13, 2007

(65) Prior Publication Data

US 2008/0193255 A1 Aug. 14, 2008

(51) Int. Cl.
  *B23K 11/14* (2006.01)
  *F16B 37/06* (2006.01)
(52) U.S. Cl. ............... 219/93; 219/91.2; 411/171; 411/378
(58) Field of Classification Search ........... 219/91.2, 219/93, 118; 411/171, 349, 549, 553
See application file for complete search history.

(56) References Cited

U.S. PATENT DOCUMENTS

| | | | |
|---|---|---|---|
| 4,408,900 A * | 10/1983 | Takasugi et al. | 368/295 |
| 4,568,215 A | 2/1986 | Nelson | |
| 4,726,702 A | 2/1988 | Jackman | |
| 4,855,562 A * | 8/1989 | Hinden | 219/93 |
| 5,152,582 A | 10/1992 | Magnuson | |
| 5,579,986 A | 12/1996 | Sherry | |
| 5,632,912 A | 5/1997 | Cecil | |
| 5,673,927 A | 10/1997 | Vermillion | |
| 5,808,266 A | 9/1998 | Cecil | |
| 6,543,828 B1 | 4/2003 | Gass | |
| 6,669,428 B2 | 12/2003 | Autterson | |
| 6,758,645 B2 | 7/2004 | Curley, Jr. et al. | |
| 6,765,171 B1 | 7/2004 | Hengel et al. | |
| 6,837,660 B2 | 1/2005 | Schmich | |
| 6,905,295 B2 | 6/2005 | Stevenson et al. | |
| 2003/0129041 A1 * | 7/2003 | Mitts et al. | 411/171 |
| 2004/0047705 A1 | 3/2004 | Cutshall | |
| 2004/0213634 A1 | 10/2004 | Kortmann et al. | |
| 2006/0113031 A1 | 6/2006 | Langtry | |
| 2007/0092354 A1 * | 4/2007 | Nilsen et al. | 411/171 |

FOREIGN PATENT DOCUMENTS

JP  63157771 A  *  6/1988

* cited by examiner

*Primary Examiner*—Stephen J Ralis

(57) ABSTRACT

A method is provided for attaching a fastener to the inside wall of a member. The fastener may be a bolt or a nut having a shank and a shaped head with head portions radiating from the shank. A hole is made in the member and has a shape closely corresponding to the shape of the head. The head of the fastener is inserted into the shaped hole and the fastener is reoriented so that the head engages with the inside walls of the member and therefore the fastener cannot be withdrawn. Electric current is applied to the fastener and the member to bond the head to the inside wall of the member either by heat curing an adhesive coating the head or by creating an electric resistance projection weld between the fastener head and the member.

3 Claims, 6 Drawing Sheets

METHOD FOR WELDING AND ADHESIVELY
ATTACHING A SHAPED FASTENER TO
INSIDE OF MEMBER

FIELD OF THE INVENTION

The present invention relates to a method for attaching a fastener to the inside of a member.

BACKGROUND OF THE INVENTION

It is well known in the automobile and other industries to attach a fastener such as a nut or a stud to a structural member such as a tube. In some cases an adhesive is used to attach the head of the stud to the outside of the tube. In other cases the fastener head is provided with projections and the attachment is made via electric resistance welding.

It is also known to attach a headed fastener to a structural member by drilling a hole in the member and then feeding the shank of the fastener through the hole from the back side of the member. In this way the head of the fastener engages with the back side surface of the member and the head prevents the fastener from being removed from the member.

It would be desirable to prove alternative methods for attaching a headed fastener to a member, for example when high strength is desired and/or the back side of the member is not sufficiently accessible to enable the fastener to be installed from the back side, as in the case of a closed form member such as a tube.

SUMMARY OF THE INVENTION

A method is provided for attaching a fastener to the inside wall of a member. The fastener may be a bolt or a nut having a shank and a shaped head with head portions radiating from the shank. A hole is made in the member and has a shape closely corresponding to the shape of the head. The head of the fastener is inserted into the shaped hole and the fastener is reoriented so that the head engages with the inside wall of the member and therefore the fastener cannot be withdrawn. Electric current is applied to the fastener and the member to bond the head to the inside wall of the member either by heat curing an adhesive coating the head or by creating an electric resistance projection weld between the fastener head and the inside wall of the member.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE
EXEMPLARY EMBODIMENTS

The following description of certain exemplary embodiments is merely exemplary in nature and is not intended to limit the invention, its application, or uses.

Figure 1:
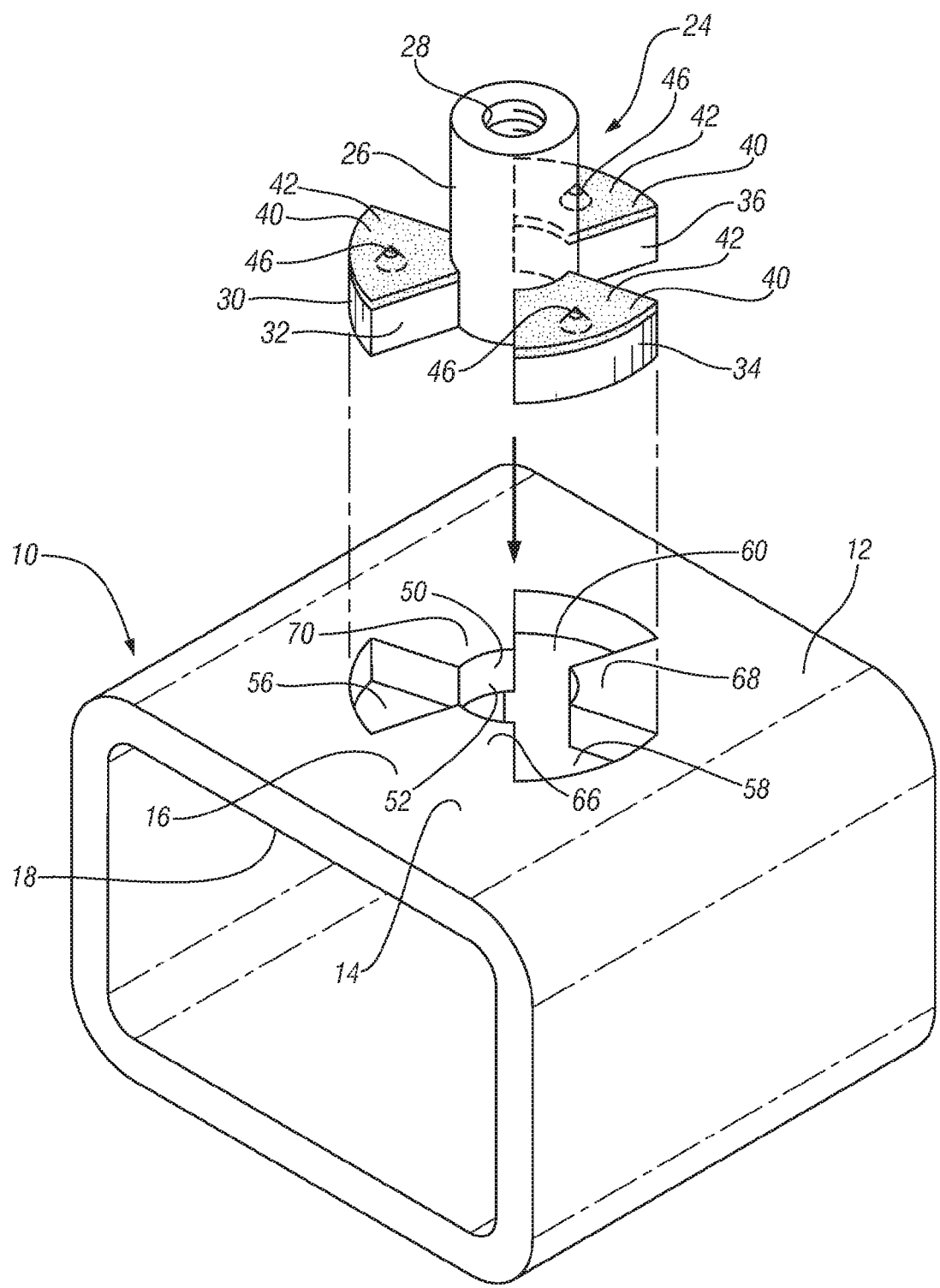
FIG. 1 is an exploded perspective view showing a headed fastener poised for insertion into a shaped hole of a closed form member.

Referring to FIG. 1, a closed form structural member 10 is a steel tube 12 of rectangular cross-section such as a frame rail in a motor vehicle. The tube 12 has a top wall 14 having an outer surface 16 and an inside surface 18.

A fastener 24 includes a shank 26 having an internal threaded bore 28 so that the fastener 24 forms a nut for eventually receiving a threaded bolt, not shown in the drawings. The fastener 24 has a head 30 that is integral with the shank 26 and includes head portions 32, 34 and 36 that radiate from the shank 26 and are arrayed circumferentially around the shank 26. The head portions 32, 34 and 36 each have a top surface 40 that is coated with a layer 42 of a heat curable adhesive such as Dow 1482, available from the Dow Chemical Company, Inc. Also, each of the head portions 32, 34 and 36 has a projection 46 that rises from the top surface 40.

As seen in FIG. 1, the top wall 14 of tube 12 has a shaped hole 50 therein that is shaped to receive the head 30 of the fastener 24. The shaped hole 50 includes a central hole portion 52 that is of a diameter to receive the shank 26 and hole portions 56, 58 and 60 that radiate outwardly from the central hole portion 52. As seen in FIG. 1, the formation of the shaped hole 50 leaves wall portions 66, 68 and 70 of the wall 14 that radiate toward the central hole portion 52 and straddle the hole portions 56, 58 and 60.

Figure 2:
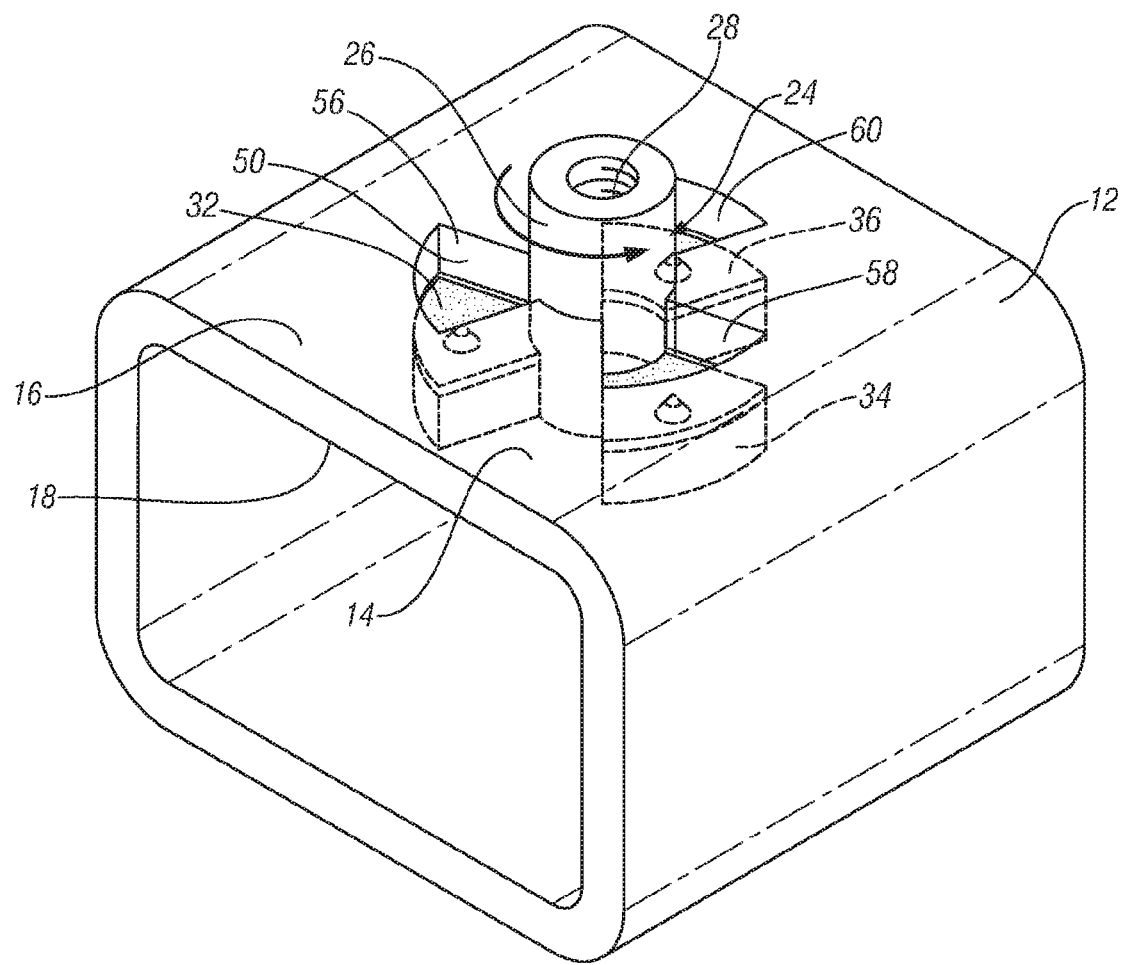
FIG. 2 is a perspective view showing the headed fastener inserted into the shaped hole of the closed form member.

Referring to FIG. 2, it is seen that the fastener 24 is inserted into the shaped hole 50 by aligning the head portions 32, 34 and 36 with the hole portions 56, 58 and 60 and then lowering the fastener 24 into the shaped hole 50, and then rotating the fastener 24.

Figure 3:
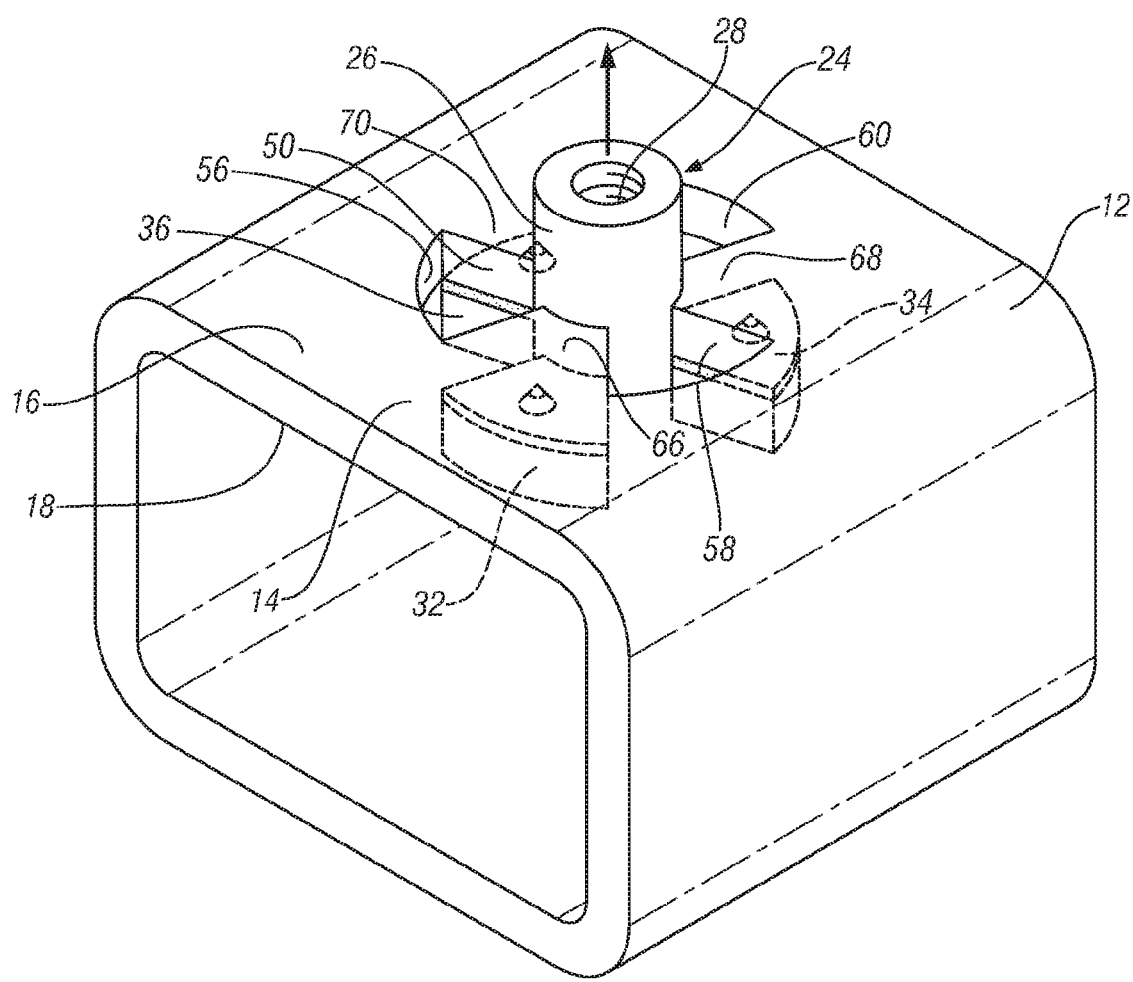
FIG. 3 is a perspective view showing that the headed fastener has been rotated so that the head portions of the headed fastener have been rotated away from the shaped hole and are aligned for engagement with the inside wall of the closed form member.

FIG. 3 shows that the fastener 24 has been rotated sufficiently to cause the head portions 32, 34 and 36 to align with the wall portions 66, 68 and 70 of the top wall 14. The fastener 24 is lifted upwardly so that the projections 46 will engage with the inside surface 18 of tube 12.

Figure 4:
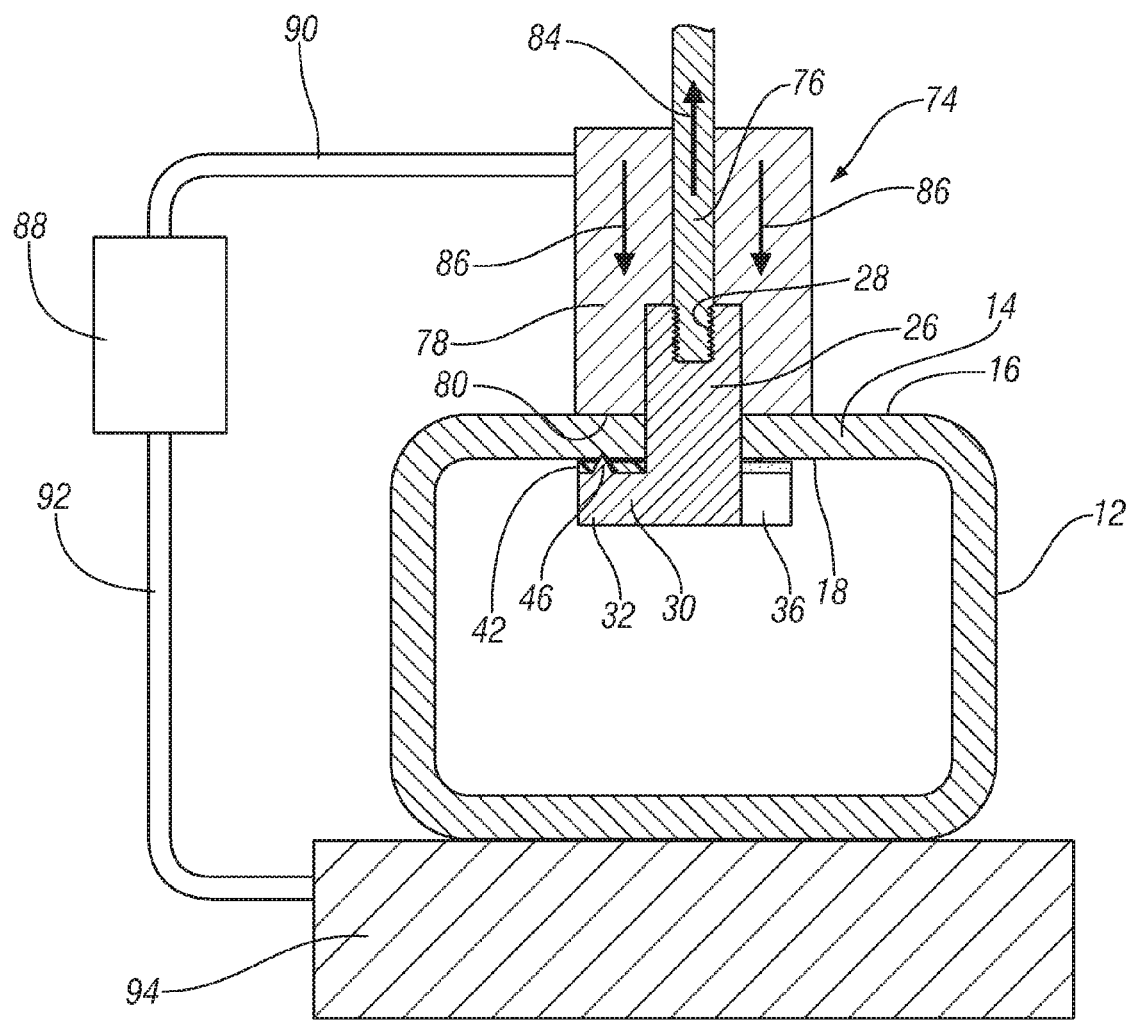
FIG. 4 is a section view through the closed form member and the fastener and shows a schematic of a tool for installing the fastener.

FIG. 4 shows the tooling for installing the fastener 24. A tool assembly, generally indicated at 74, includes a threaded stem 76 that is threaded into the threaded bore 28 of the fastener shank 26. The tool assembly 74 also has a sleeve 78 that surrounds the threaded stem 76. Sleeve 78 has a lower end face 80 that is adapted to seat upon the outer surface 16 of the top wall 14 of tube 12. The tool assembly 74 includes linear and rotary actuators, not shown, by which the threaded stem 76 may be rotated to perfectly align the fastener head 30 with the shaped hole 50 as shown in FIG. 1, then lower and insert the fastener head 30 into the shaped hole 50 as shown in FIG. 2, and then rotate the fastener 24 to the position of FIG. 3.

In FIG. 4, the tool assembly 74 is shown to be raising its threaded stem 76 in the direction of arrow 84 while pushing down with the sleeve 78 in the direction of arrows 86 so that the projections 46 of each of the fastener head portions 32, 34 and 36 are engaged with the inside surface 18 of the tube upper wall 14.

The tool assembly 74 includes a weld unit 88 that provides electrical current through a cable 90 attached to the sleeve 78 and a cable 92 attached to an electrode 94 that engages the tube 12. When weld current of opposite polarity is applied to the fastener 24 and to the tube 12, electric resistance heating occurs and is concentrated at the point of contact between the projections 46 of the fastener 24 and the inside surface 18 of the tube wall 14. The heating of the adjacent surfaces of the fastener head 30 and the inside tube wall 18 will heat the adhesive layer 42 and cure the adhesive layer 42 so as to permanently attach the fastener 24 to the tube 12.

Figure 5:
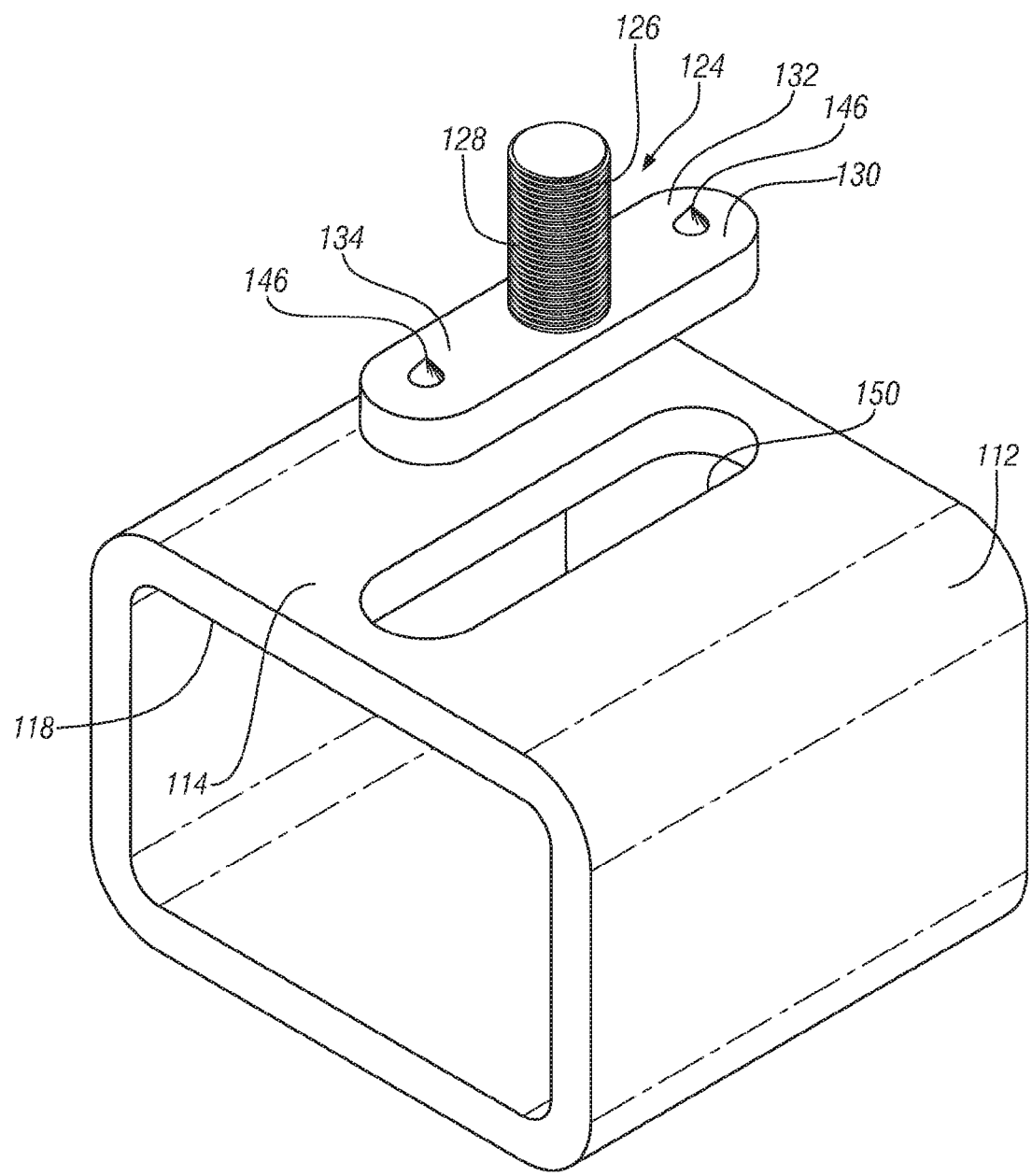
FIG. 5 is an exploded view similar to FIG. 1 but showing another embodiment of the invention; and, FIG. 6 is a section view through the closed form member of FIG. 5 showing a schematic of a tool for installing the fastener.

FIG. 5 shows another embodiment of the invention. In FIG. 5, the fastener 124 has a shank 126 that carries an external thread 128, so that the fastener 124 may be considered a bolt as opposed to the fastener 24 of FIGS. 1-4 which has an internal thread to form a nut. The fastener 124 has a fastener head 130 including two head portions 132 and 134 that are integral with the shank 126 and radiate outwardly therefrom in opposite directions so that the head 130 is generally oval and elongated in shape. A projection 146 rises from each of the head portions 132 and 134. The tube 112 of FIG. 5 includes a tube top wall 114 having a shaped hole 150 that corresponds to the shape of the fastener head 130.

Figure 6:
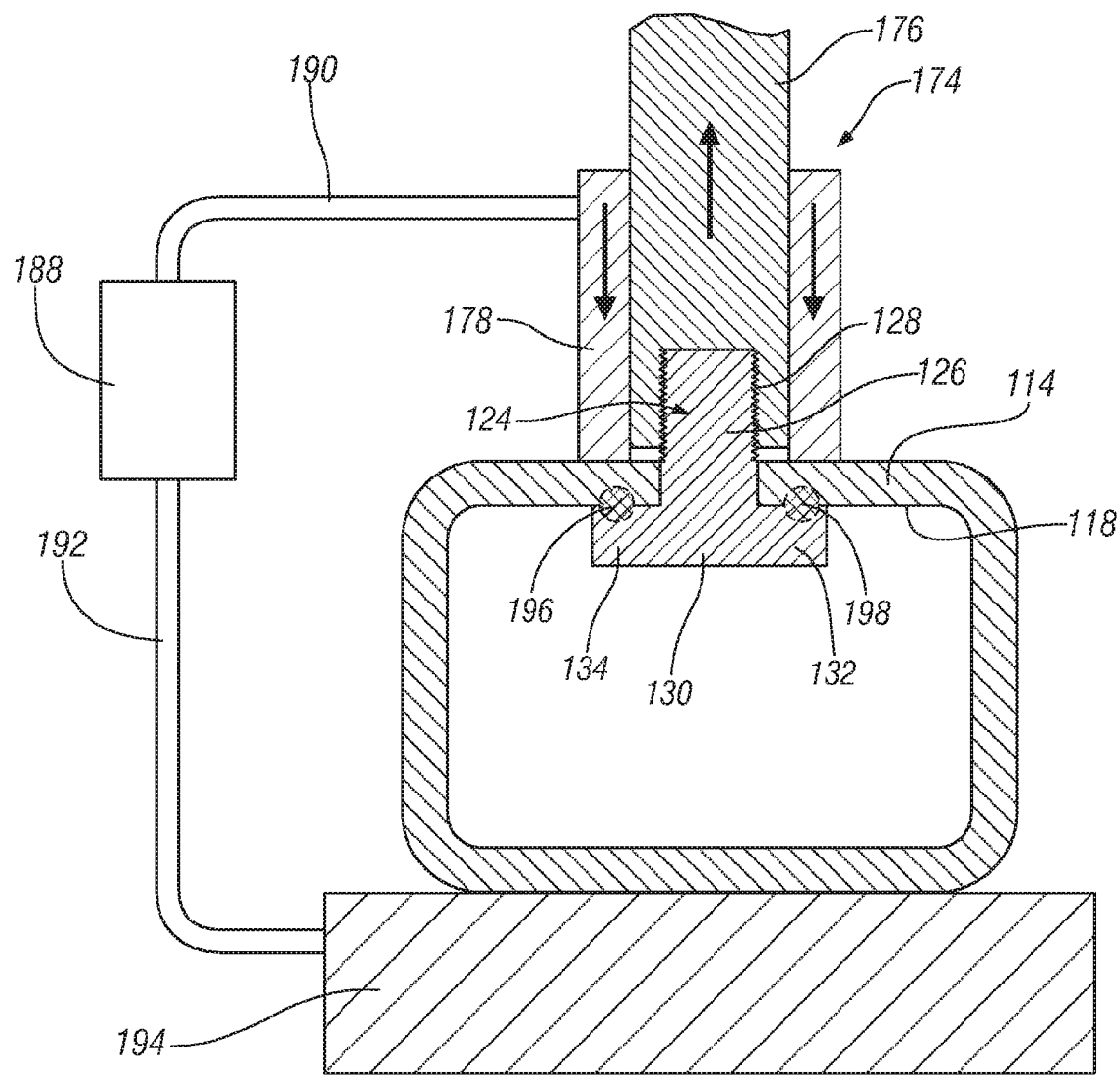

Referring to FIG. 6, it is seen that the external threads 128 of fastener 124 have been captured within a threaded bore of a stem 176 that is in turn surrounded by a sleeve 178 of a tool assembly 174. The tool assembly 174 has aligned the head 130 of the fastener 124 with the shaped hole 150 of the tube 112, inserted the head 130 into the shaped hole 150, and then rotated the fastener 124 so that the head portions 132 and 134 underlie the inside surface 118 and the fastener 124 cannot be withdrawn from the tube 112.

The tool assembly 174 includes a weld unit 188 that provides electrical weld current through a cable 190 attached to the sleeve 178 and a cable 192 attached to an electrode 194 that engages the tube 112. When weld current is applied, electric resistance heating occurs and is concentrated at the point of contact between the projections 146 of the fastener 124 and the inside surface 118 of the tube wall 114. The current is applied at a level and for duration sufficient to form electric resistance projection welds 196 and 198 at the projections 146, so as to permanently attach the fastener 124 to the tube 112.

The foregoing description of the invention is merely exemplary in nature and, thus, variations thereof are intended to be within the scope of the invention. For example although the fasteners shown in the drawings are provided with three head portions in the example of FIGS. 1-4 and two head portions in the example of FIGS. 5-6, it will be understood that any plurality of radiating head portions can be employed, in which case the shaped hole in the tube will have a correspondingly shaped hole for receiving that number of head portions. In addition, it is seen that the fastener can be either adhesively bonded to the inside wall of the tube or attached thereto by the formation of an electric resistance projection weld. The adhesive bond or the projection weld will function to prevent the fastener from rotating in the hole or being pushed axially and inwardly away from the inside tube wall. In addition, because the head portions underlie and engage with the inside tube wall, it is assured that the fastener cannot be axially extracted through the hole. The fastener may be either an internally threaded nut or an externally threaded stud, or any other type of fastener or clip known in the industry.

If desired, the fastener can be attached using both an adhesive bond and an electric resistance weld. In this case, the fastener head is coated with the adhesive, and the electric current is maintained at a level and for a duration that is sufficient to form the resistance projection welds between the projections and the inside tube wall, while the heat generated also cures the adhesive. Thus the fastener is bonded to the inside tube wall by both an adhesive bond and a resistance weld.

The method disclosed herein is useful in attaching a fastener to a closed tube or some other structure that has walls or other obstacles that render it impractical to have enough access to the inside thereof to permit a fastener to be installed from the inside of the member to project to the outside of the member through a hole. However the attachment method herein is also useful in the case of a sheet metal member or other structure, and enables the one-sided insertion and attachment of the fastener from top side of the member without requiring access to the back side of the member.

What is claimed is:

1. A method for attaching a head of a fastener to an inside wall of a member having the inside wall and also having an outside wall, comprising;
    providing a fastener having a head and a threaded shank, the head having a plurality of fastener head portions that radiate from the threaded shank and are spaced circumferentially from one another, said fastener head portions each having at least one projection thereon and each of said fastener head portions also carrying a heat curable adhesive;
    making a shaped hole in the member; the shaped hole having a central portion shaped to receive the shank and a plurality of hole portions that radiate from the central portions and being shaped to closely receive a corresponding one of the plurality of head portions;
    providing a tool having a threaded stem surrounded by a sleeve that is engaged with the outside wall of the member and the tool having rotary and linear actuators for moving the threaded stem relative the sleeve;
    threadedly engaging the threaded stem of the tool with the threaded shank of the fastener so that rotary and linear movement of the threaded stem will move the fastener;
    operating the linear actuator of the tool to insert the head of the fastener into the shaped hole and then operating the rotary actuator of the tool to rotate the fastener so that the fastener head portions engage with the inside wall of the member and cannot be withdrawn from the shaped hole;
    and applying electric current of opposite polarity to the fastener and the member to bond the head to the inside wall of the member by electric resistance heating that cures the adhesive to create an adhesive bond and also creates an electric resistance weld between the projections of the fastener head portions and the inside wall of the member.

2. The method of claim 1 further comprising the fastener being a nut having an internal thread.

3. The method of claim 1 further comprising the fastener being a bolt having a head and a threaded shank.

* * * * *